April 22, 1941.  K. J. W. FREITAG  2,239,286
DUAL AXLE TRUCK TRAILER
Filed March 27, 1939
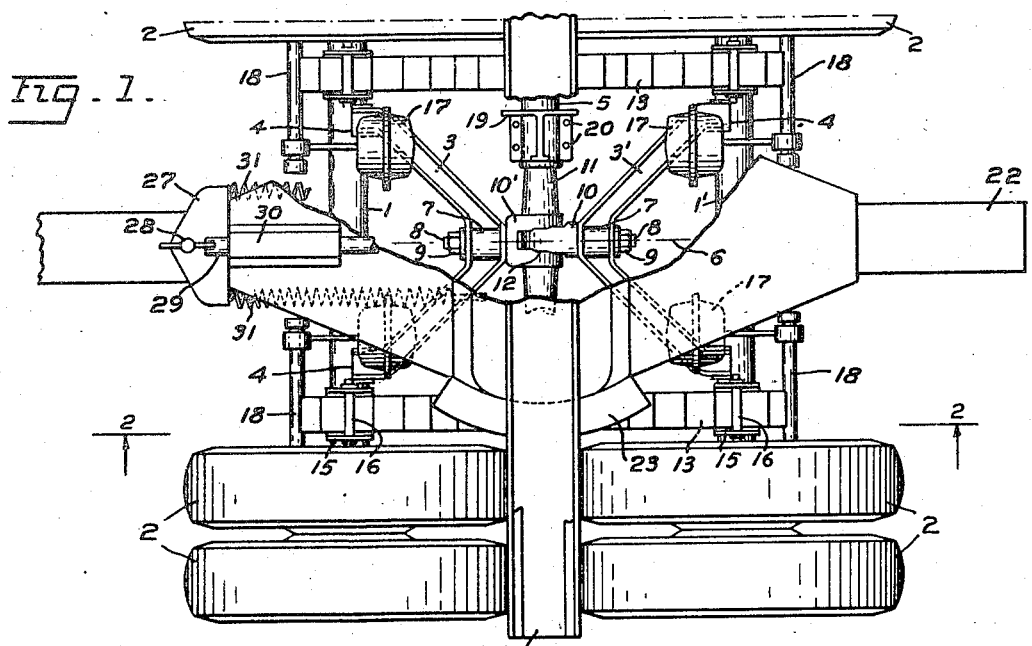
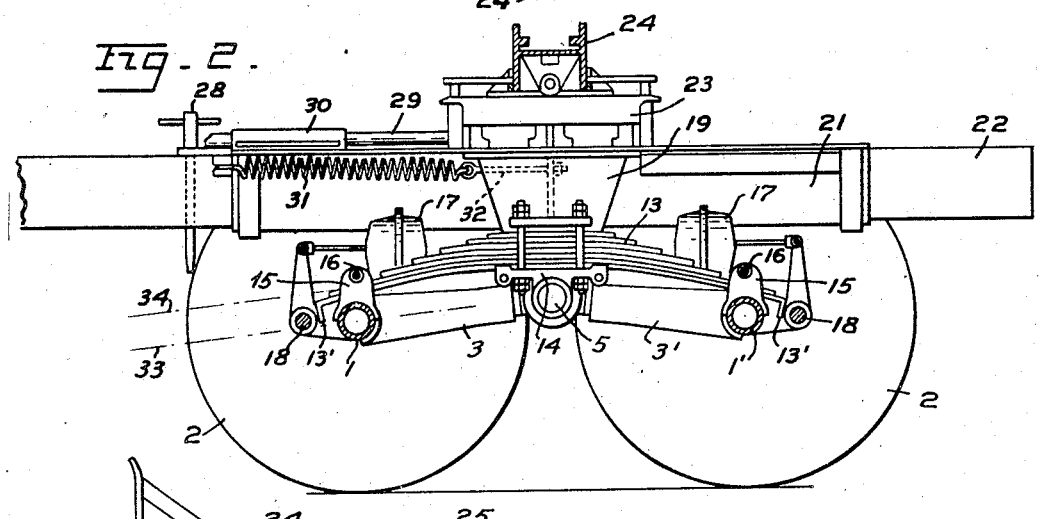
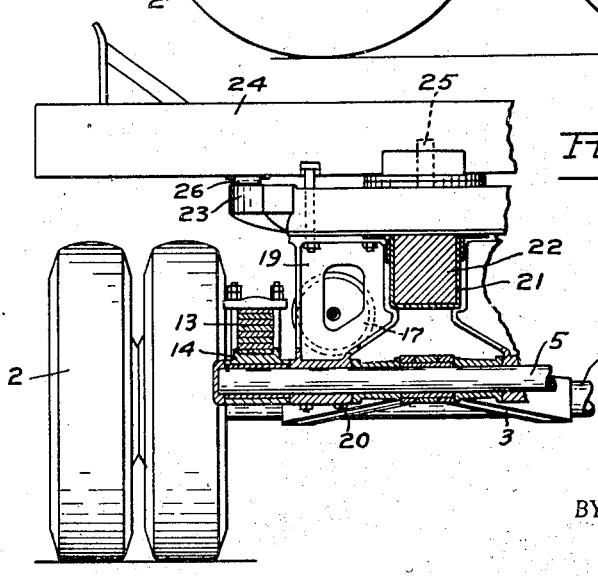
INVENTOR.
KNUD J. W. FREITAG
BY
ATTORNEY.

Patented Apr. 22, 1941

2,239,286

UNITED STATES PATENT OFFICE 2,239,286

DUAL AXLE TRUCK TRAILER

Knud J. W. Freitag, Oakland, Calif., assignor to F. A. B. Manufacturing Co., Oakland, Calif., a corporation of Nevada Application March 27, 1939, Serial No. 264,368

7 Claims. (Cl. 280—124)

This invention relates to truck trailers as used at the rear end of a reach pole extending to the hauling truck, so as to space the trailer some distance to the rear of the truck for supporting long heavy loads such as large long logs, long pipes, beams or similar loads.

The object of the invention is to provide an improved dual axle truck for the purpose mentioned, which will yield to the inequalities of the road, and absorb or balance all brake torque without affecting the springs. Other features and advantages of the invention will appear in the following description and accompanying drawing.

In the drawing:

Figure 1 is a plan view of my improved dual axle trailer with the wheels at one side partly broken away and with a portion of the swivel load bunk and reach pole sleeve or tube broken away to better show the swivel connection of the torque yokes to the spring supporting shaft.

Figure 2 is a longitudinal section taken along the line 2—2 of Figure 1.

Figure 3 is an end elevation of Figure 1 showing about one half of the full width of the trailer.

In further detail the dual axles of the trailer are indicated at 1 and 1', here shown with double wheels 2 on opposite ends. The dual axles are spaced in parallel position by means of two Y shaped yokes 3, 3' which are rigidly attached at the ends of their arms to the axles as by welding at 4, or otherwise, and both swivelly and pivotally connected to an intermediate or spring supporting shaft 5 in a manner so that the yokes may independently turn about a longitudinal axis 6 as well as independently rise and fall about the axis of the shaft 5. To carry this out the yokes are each provided with a central longitudinally extending bearing 7 which rotatably embraces a stub shaft 8, the outer end of which is retained in position as by a nut or collar 9, and the inner end of each stub shaft is provided with a member 10, 10' which rotatably embrace shaft 5 between a pair of fixed collars 11.

Shaft engaging member 10' is bifurcated to receive member 10 and the adjacent inner surfaces of these members are formed with offsets as indicated at 12 to form a stop to limit the downward movement of the central joint relative to the outer ends of the yokes 3, 3'.

The road springs 13 are of the leaf-type centrally bolted to saddles 14 rotatably supported on the outer ends of shaft 5 and with the lowest and longest of the leaf springs overlapping the axles and with the extreme ends of the leaf bent downwardly as at 13', while spring positioning lugs 15 extend upwardly at opposite sides of the springs and are connected by a bolt or pin 16 at a point high enough so as not to interfere with the flexing of the springs.

Secured to the dual axles at points adjacent the four ends of the springs are four vacuum or other power brake actuators 17 adapted to be connected to a source of fluid power on the truck engine not shown, and each operatively connected to a brake operating shaft 18 for operating the brake of the adjacent wheel.

A frame 19 is supported on shaft 5 as by clamping to it at points 20, and centrally in which frame is a rectangular tube 21 to slidably receive the reach pole 22 which extends from the hauling truck not shown, while above the reach pole tube 21 is a pair of fifth-wheel segments 23 above which is a transversely extending load carrying beam 24 or "bunk" as it is termed and which is centered on a vertical pin indicated at 25, and provided with rollers indicated at 26 which roll on the segments 23 to complete the fifth-wheel assembly.

At the forward end of the reach pole tube 21 is plate 27 which overlies the pole and is locked to it as by a pin or bolt 28 passing vertically through both plate and pole as shown in Figure 2, and plate 27 is firmly mounted at one end of a rod 29 which is slidably supported in a long guide 30 secured to plate 27. At opposite sides of the pole 22 are coiled tension springs 31 each secured at their opposite ends to a tension adjusting bolt 32 in turn anchored to the frame 19. This is to permit sliding of the reach pole in tube 21 when making turns with a load such as a huge log extending from the bunk on the trailer to the similar bunk (not shown) of the hauling truck.

Returning now to the sectional view, Figure 2 which indicates the unloaded position of the springs, it will be observed that the angles of the yokes 3 and 3' both extend downwardly from the axis of spring supporting shaft 5 substantially parallel to the angles of the unloaded springs, as indicated by the two dot and dash lines 33, 34, and from a consideration of which it will be apparent that as the springs are deflected downwardly under a load placed on the bunk, shaft 5 will correspondingly descend to carry the joint formed by the shaft and yoke members 10 and 10' downwardly and thus flatten out the angle of the yokes to the same degree that the springs are flattened out, and thereby minimize or obviate any sliding action of the ends of the springs on their axle seats, while at the same time preserving entire freedom of the ends of the springs for any slight adjustment or twisting movement required.

When applying the brakes to the four wheels the tendency is of course to transfer the torque to the axles. This tends to lift the inner end of one yoke (3) and depress the inner end of the other yoke (3') but since they are both pivoted to spring supporting shaft 5, the forces are neutralized, yet without impeding or otherwise affecting the action of the road springs. The longitudinal yoke axis 6 gives perfect freedom at all times for the wheels to follow the varying surface of the road, and the springs are free at their ends to tilt slightly to accommodate this.

Having thus described my improved dual axle truck trailer what I claim is:

1. In a truck trailer of the character described, a pair of horizontally spaced axles carrying road wheels at their four ends, a spring supporting shaft arranged parallel to and intermediate said axles, leaf-type road springs carried at the ends of said shaft and freely supported at their outer ends by said axles, articulated means positively spacing said axles from said shaft in planes respectively parallel thereto at all times, said articulated means formed and adapted to permit independent rotary movement of said axles respectively on arcs struck from the center of said shaft, and also independent rotary movement about an axis extending at right angles only to said shaft and means positively holding said axles against longitudinal shifting.

2. In a truck trailer of the character described, a pair of horizontally spaced axles carrying road wheels at their four ends, a spring supporting shaft arranged parallel to and intermediate said axles, leaf-type road springs carried at the ends of said shaft and supported at their outer ends by said axles, articulated means positively spacing said axles from said shaft in planes respectively parallel thereto at all times, said articulated means formed and adapted to permit independent rotary movement of said axles respectively on arcs struck from the center of said shaft, and connected to and for positively spreading said axles apart in conformity with the increase in road spring length under load deflection and vice versa.

3. In a truck trailer of the character described, a pair of horizontally spaced axles carrying road wheels at their four ends, a spring supporting shaft arranged parallel to and intermediate said axles, leaf-type road springs carried at the ends of said shaft and freely supported at their outer ends by said axles, articulated means spacing said axles from said shaft in planes parallel thereto, said articulated means formed and adapted to permit independent rotary movement of said axles respectively on arcs struck from the center of said shaft, and also independent rotary movement about an axis extending at right angles to said shaft, the ends of said road springs freely overlying said axles adjacent said wheels, means laterally positioning the ends of the springs with respect to the axles but otherwise maintaining the ends of the springs free from restraint, the extreme ends of the springs being bent to hook form to prevent pulling inward from said axles.

4. In a truck trailer of the character described, a pair of horizontally spaced axles carrying road wheels at their outer ends, a spring supporting shaft arranged intermediate said axles, leaf-type road springs carried at the ends of said shaft and supported at their ends by said axles, a pair of opposed V shaped yokes rigidly secured at their bifurcated ends to said axles respectively and each pivoted at the opposite end around said shaft to permit independent rotary movement only of each axle with respect to said shaft on an arc struck from the center of the shaft, said road springs being downwardly arched at both ends when not loaded, and said yokes being similarly angularly disposed to substantially follow the angle of the springs as they are deflected under load.

5. In the construction set out in claim 4 a swivel joint in each yoke at the juncture of its bifurcated ends, to permit independent rotary movement of each axle on an axis extending at right angles to said shaft and means preventing longitudinal movement of said swivel joint with respect to said yoke.

6. In a structure as set out in claim 4, the pivotal connection of the yokes to said shaft including a longitudinally extending bearing at the apex of each yoke, a stub-shaft pivotally positioned in each bearing and provided with means preventing longitudinal shifting therein, and said stub-shafts extending toward one another from the ends of said yokes and each pivotally engaging around said shaft.

7. In a structure as set out in claim 4, the pivotal connection of the yokes to said shaft including a longitudinally extending bearing at the apex of each yoke, a stub-shaft pivotally positioned in each bearing and provided with means preventing longitudinal shifting therein, and said stub-shafts extending toward one another from the ends of said yokes and each pivotally engaging around said shaft, one of said stub-shafts bifurcated at its end where embracing said shaft and the other stub-shaft embracing the said shaft at a point between the bifurcated ends of the other stub shaft.

KNUD J. W. FREITAG.